FIG. 1

INVENTOR.
WILLIAM G. A. TROLLOPE

INVENTOR.
WILLIAM G. A. TROLLOPE

Nov. 11, 1969    W. G. A. TROLLOPE    3,477,548
CURRENT LIMIT CHAIRING SYSTEM
Filed June 4, 1965    7 Sheets-Sheet 5

INVENTOR.
WILLIAM G. A. TROLLOPE

FIG. 9

INVENTOR.
WILLIAM G. A. TROLLOPE

Nov. 11, 1969  W. G. A. TROLLOPE  3,477,548
CURRENT LIMIT CHAIRING SYSTEM
Filed June 4, 1965  7 Sheets-Sheet 7

INVENTOR.
WILLIAM G. A. TROLLOPE

United States Patent Office 3,477,548
Patented Nov. 11, 1969

3,477,548
CURRENT LIMIT CHAIRING SYSTEM
William G. A. Trollope, Terrasse Vaudreuil, Quebec, Canada, assignor to Canadian Ingersoll-Rand Company Limited, Montreal, Quebec, Canada, a corporation of Canada
Filed June 4, 1965, Ser. No. 461,475
Int. Cl. B66b 1/24
U.S. Cl. 187—29          16 Claims

ABSTRACT OF THE DISCLOSURE

A hoist apparatus for moving a load into alignment with a loading level, which is constructed such that the load is stopped by the hoist drive at a position adjacent the loading level and then moved by fluid operated motor means at low speed into alignment with the loading level.

---

This invention relates to hoists and more particularly to hoist control apparatus and represents a further improvement on my earlier filed, copending application entitled, "Current Limit Chairing System," which was filed on Nov. 24, 1964, as patent application Ser. No. 413,588.

My earlier filed, above-identified application discloses an apparatus for chairing a hoist cage which utilizes the current or torque limit feature on the electric drive of the hoist. This earlier apparatus is, however, dependent upon the ability of the hoist electric drive to lower the hoist cage onto the chairs at a very low approach speed as, if the cage approach speed is excessive, the impact of the cage on the chairs may damage the cage. Furthermore, should the cage approach speed be too high, the inertia effects in the apparatus may momentarily diminish the tension in the ropes to a dangerously low value.

It has been determined that it is usually preferable for the cage to approach the chairs at a speed of approximately one inch per second, such a speed being, of course, only one percent or even less of the full speed of the hoist. However, conventional hoist drives are not capable of maintaining speed control to such a low value.

An object of the present invention is to provide a new and improved control means for providing a hoist cage with such a low approach speed as to minimize the effects of cage impact.

Another object of the invention is to provide a new and improved speed control means of the type set forth which requires only a minimal amount of electrical power for its operation.

Another object is to provide a new and improved speed control means of the type set forth which is readily adaptable for use with both single and multideck cages.

Another object is to provide a new and improved speed control means of the type set forth which is highly efficient in operation.

Other objects and advantages of the invention will be apparent from the following description taken in connection with the accompanying drawings. It will be understood that changes may be made in the details of construction and arrangement of parts shown and described as the preferred forms of the invention have been given by way of illustration only.

For a better understanding of the present invention reference should be had to the accompanying drawings, wherein like numerals of reference indicate similar parts throughout the several views and wherein.

Figure 1:
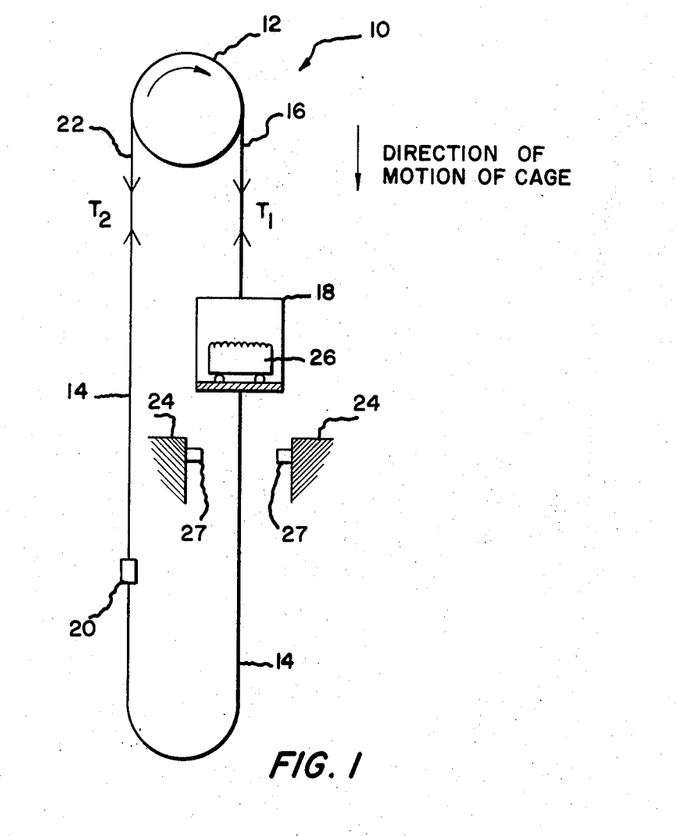
FIG. 1 is a diagrammatic view generally of a hoist apparatus with the cage thereof above its loading level.

FIG. 1 illustrates, diagrammatically, a hoist apparatus 10 of the friction type; comprising a rotatable drum means 12 having the hoist ropes 14 therearound. A hoist cage 18 is supported by the hoist ropes 14 on the cage side 16 of the drum means 12 and is counterbalanced by a counterweight 20 which is suspended by the hoist ropes 14 on the counterweight side 22 of the drum means 12. As illustrated, the hoist cage 18 carries a load or mine car 26 and is being lowered onto the chairs 27 at the loading level or shaft station 24.

Figure 2:
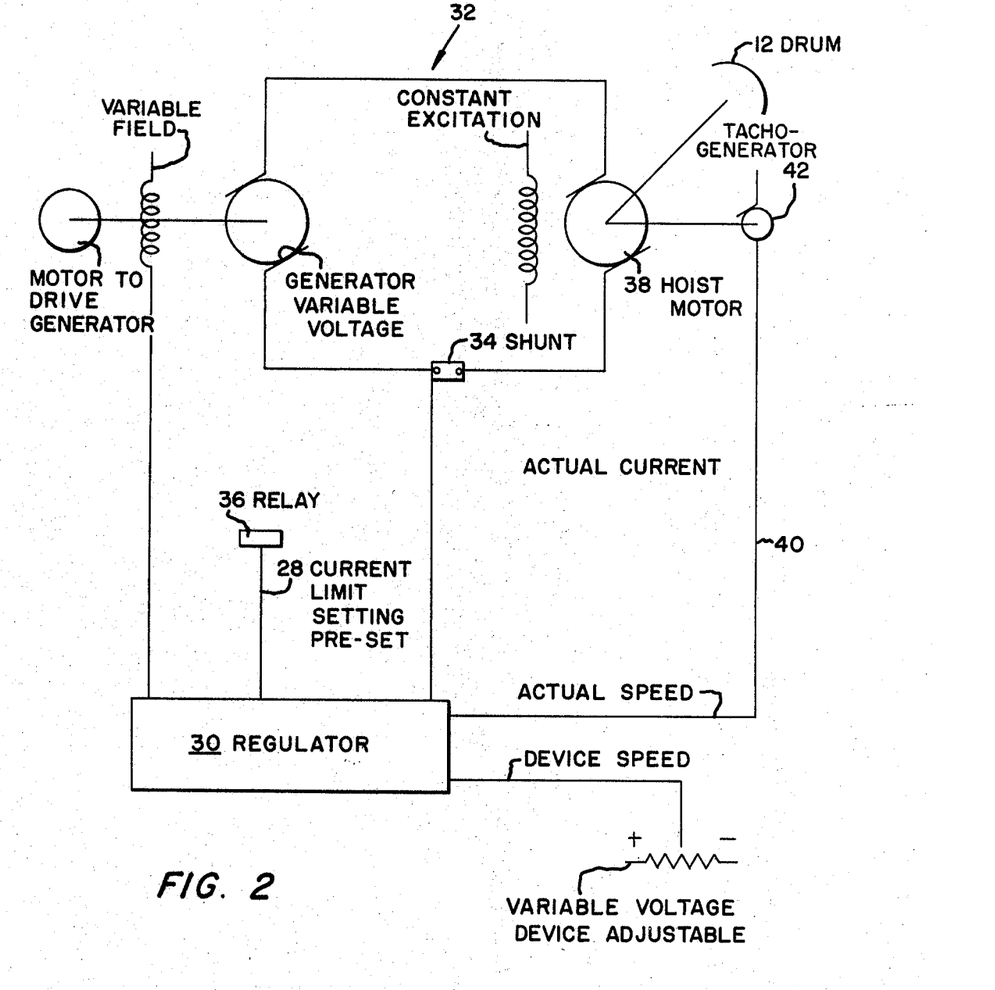
FIG. 2 is a diagrammatic view of the electrical control system for operating the hoist apparatus illustrated in FIG. 1.

As will be seen from FIG. 2 of the drawings and as was disclosed in my earlier, copending application, Serial No. 413,588, filed Nov. 24, 1964, the electrical control system for operating the hoist apparatus 10 includes a control such as a current limit circuit 28 which is connected to a regulator 30 to protect the direct current machines in the variable voltage DC drive 32 of the system from excessive system circulating current. More specifically, a voltage proportional to the system circulating current is obtained from a shunt 34 in the DC loop and is compared by the regulator 30 with a preset voltage fed therein by a relay 36. When the actual current of the system exceeds the preset current, the generator field is changed to minimize the excess current. Thus, it will be understood that the current limit circuit 28 is only operative when the hoist apparatus 10 is trying to draw a current in excess of that preset in the regulator 30 such as, for example, when a drum means 12 is stalled against its brakes.

Furthermore, as the hoist motor current is proportional to the torque output of the hoist apparatus 10 and the motor torque under constant speed conditions is proportional to the equivalent rope pull exerted on the hoist ropes 14, this current limit setting may be employed to stabilize the hoist apparatus 10 when the hoist cage 18 is stalled. The illustrated electrical control circuit, therefore, limits the torque that the hoist motor 38 exerts by limiting the circulating current to a preset value.

The torque that the hoist motor 38 will exert can be expressed in terms of an equivalent rope pull which is the force applied by the drum means 12 to the ropes 14 in the direction of the rope's axis. In order to stabilize the cage 18 on the chairs 27 at the loading level 24, the equivalent rope pull is applied in the direction tending to force the cage 18 downwardly towards the chairs 27.

On a counterweighted friction hoist with a tail rope such as is illustrated in FIG. 1 as 10, the static tension $T_2$ in the ropes 14 on the counterweight side 22 of the drum means 12 is approximately constant at the drum means 12 when such is driving the cage 18 downwardly. The tension $T_1$ at the drum means 12 on the cage side 16 thereof will be equal to the tension on the counterweight side 22 less the equivalent rope pull. Thus, assuming the cage side tension to be $T_1$ and the counterweight side tension to be $T_2$, the relationship of the forces at the drum means 12 can be expressed in equation form as:

$$T_1 = T_2 - \text{Equivalent Rope Pull}$$

The equivalent rope pull can be set to a value leading to a safe value of $T_1$. In other words, the cage side tension $T_1$ can be chosen low enough to insure tht the cage 18 will not rise off the chairs 27 when unloaded and is yet not low enough to cause rope slip.

It will be understood by those skilled in the art that, with a preset equivalent rope pull, when the cage 18 is lowered onto the chairs 27, the speed of the drum means 12 will be controlled by the speed feedback circuit 40 from the tachogenerator 42 to the regulator 30. When the drum means 12 is in motion, the strength of the generator field is determined by the conditions in the speed feedback circuit 40, as the drum means 12 is rotating at a desired speed and the current drawn by the motor 38 is not high enough to affect the preset current in the current limit circuit 28.

When the cage 18 moves downwardly into contact with a sufficient resistance to downward motion, the hoist apparatus 10 will stall. Thus, the actual speed of the drum means 12 will be reduced below the desired speed thereof and the hoist motor 38 will draw additional current in an effort to increase the speed of the cage 18. The hoist motor current will, thus, reach the current limit setting such that when the hoist apparatus 10 reaches absolute rest the torque of the motor 38 will be controlled by the preset current setting in the relay 36. The tensions in the ropes 14 on the cage side 16 are thereby fixed to prevent vertical movement of the cage 18 when the load 26 thereon varies due to the loading or unloading thereof and insures a smooth loading and unloading of said load.

It will be seen by those skilled in the art that the transient conditions between the first contact of the cage 18 with the chairs 27 and the cage 18 settled at rest on the chairs 27 at the loading level 24 are of a complex nature and laborious to analyze. More specifically, before the cage 18 contacts the chairs 27, the illustrated hoist apparatus 10 has kinetic energy which can be broken down into the kinetic energy of the cage 18, of the tail ropes, of the drum means 12, of the gears (if any), of the counterweight 20, and of the other hoist ropes 14.

The kinetic energy of the cage 18 and of the tail ropes beneath it is dissipated as heat and sound when the cage 18 hits the chairs 27. The kinetic energy of the other members has to be absorbed as follows: The ropes 14 supporting the cage 18 are under tension and elastic; thus, they can be considered to be a "spring." The kinetic energy of the remainder of the before-enumerated members is converted into potential energy in this "spring" with the result that an oscillation takes place and the kinetic energy is eventually dissipated as friction. It will be noted that the maximum amount of compression in the "spring" is dependent upon the kinetic energy of the major portion of the hoist apparatus 10.

The compression in the "spring" is equivalent to a reduction in the rope tension $T_1$ and should not be excessive as was previously herein pointed out. Therefore, in order to avoid slippage it is essential that the total kinetic energy of the hoist apparatus 10 be kept to as low a value as possible immediately before the cage 18 contacts the chairs 27. Furthermore, in order to obtain this low kinetic energy of the hoist apparatus 10, it will be seen that the velocity of the cage 18 immediately before contact with the chairs 27 must be kept very low.

Figure 3:
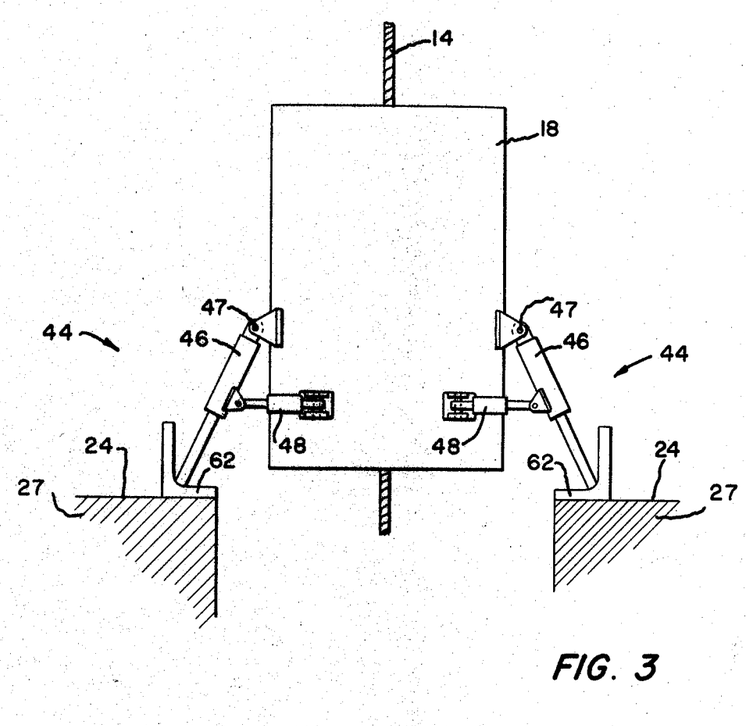
FIG. 3 is a diagrammatic view illustrating the cage of a hoist apparatus preparatory to its being chaired by a chairing mechanism at a loading level.
Figure 4:
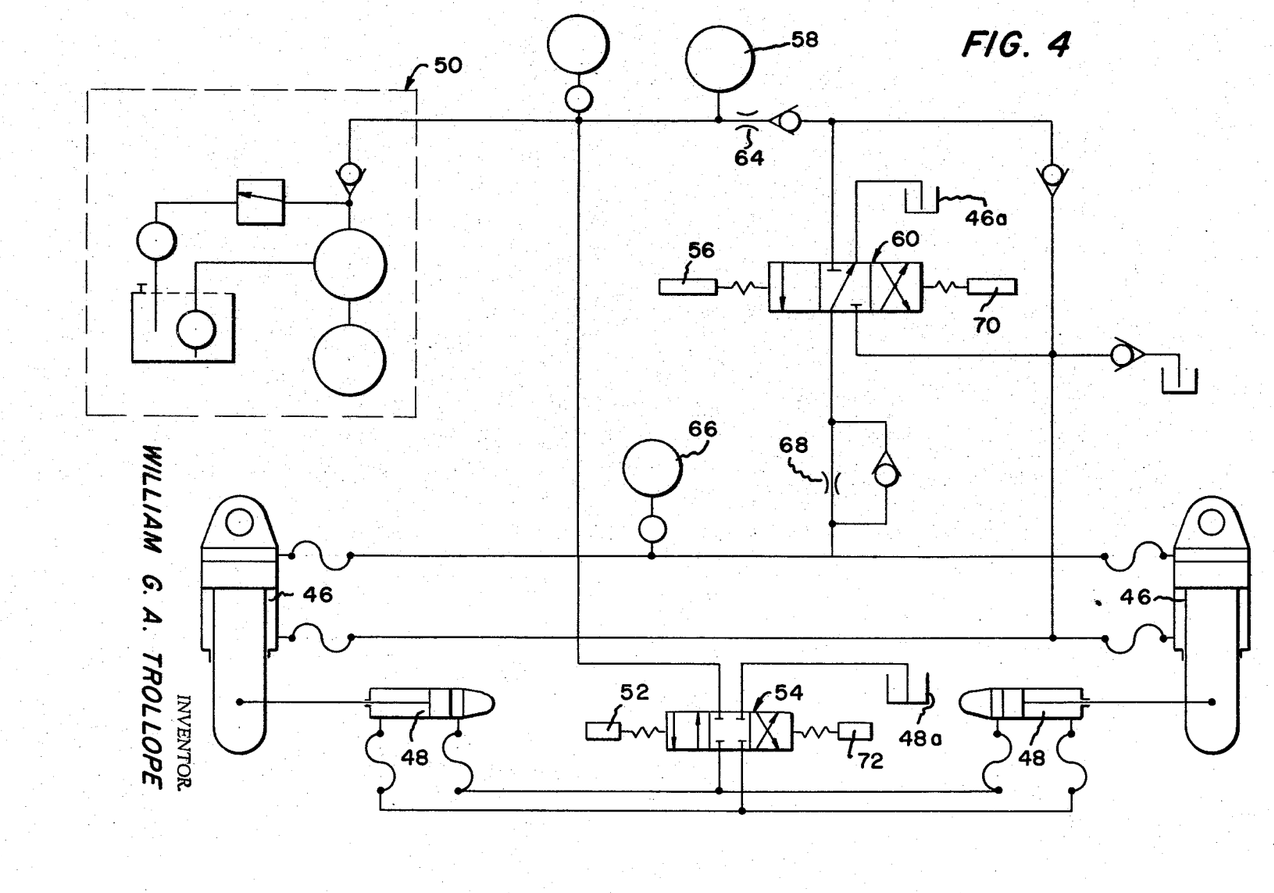
FIG. 4 is a diagrammatic view of the electrical and fluid circuitry of the chairing mechanism illustrated in FIG. 3.

FIGS. 3 and 4 illustrate the details of construction of a chairing assembly 44 which is mounted upon the cage 18 to stop the cage 18 on the chairs 27 with a low velocity immediately preceding impact. As illustrated, the chairing assembly 44 includes a plurality of chairing cylinders 46 which are pivotally mounted upon the cage 18 at 47 and serve to properly place the cage 18 relative to the chairs 27. The chairing cylinders 46 are normally maintained in a vertical position when the cage 18 is traveling between stations and are placed in contact with the chairing seats 62 during the chairing of the cage 18. In order to properly position the chairing cylinders 46 for chairing purposes, a positioning means such as the positioning cylinders 48 is carried by the cage 18 and is pivotally connected to each of the chairing cylinders 46 to allow angular movement thereof.

FIG. 4 illustrates the electrical and fluid circuitry or control means for controlling the operation of the chairing assembly 44 which is illustrated in FIG. 3. As illustrated, the hydraulic power system 50 is provided for operating the chairing and positioning cylinders 46 and 48, respectively. It will be understood, however, tht alternatively any conventional, suitable power unit may be employed to control the cylinders 46 and 48.

As will be seen from FIG. 4, in the operation of the chairing assembly 44, the cage 18 is stopped a short distance, for example, four inches above the chairs 27. At this point, a solenoid 52 is energized either manually or automatically to open a valve 54 to allow fluid such as oil to be fed to the positioning cylinders 48 for extending said cylinders to swing the chairing cylinders 46 into operative position.

In order to extend the chairing cylinders 46, the solenoid 56 is energized by either manual or automatic means to connect the accumulator 58 with the chairing cylinders 46 through a valving assembly 60 and, thereby, feed fluid such as oil to the chairing cylinders 46. Electrical interlocks such as limit switches (not shown) are connected to the solenoid 56 to prevent the energization thereof unless the positioning cylinders 48 have been previously extended to swing out the chairing cylinders 46 preparatory to chairing the cage 18.

When the chairing cylinders 46 are extended, and until they contact the chairing seats 62 (FIG. 3) on the chairs 27, the fluid pressure in the chairing cylinders 46 is comparatively low, most of the accumulator pressure being dropped across a restriction 64 near the accumulator 58. When the chairing cylinders 46 contact the chair seats 62, the pressure in the system rises, thereby operating a pressure switch 66 to de-energize the solenoid 56.

The de-energizing of the solenoid 56 actuates the valving assembly 60 to connect the chairing cylinders 46 to the drain 46a through a compensated flow valve 68. At this point, the hoist apparatus 10 lowers the cage 18 towards the chairs 27. The speed of this lowering of the cage 18 will be limited by the rate of retraction of the chairing cylinders 46, since the valve 68 which controls the rate of retraction permits a much lower speed than does the speed feedback circuit of the regulator 30. This lowering speed, as will be seen, can be made as low as one inch per second. As the retraction of the chairing cylinders 46 is thus limited by the rate of fluid flow permited by the valve 68, the hoist motor 38 will therefore exert the full torque permitted by the current limit setting. Furthermore, when the chairing cylinders 46 are fully retracted, the cage 18 will stop in position for loading and unloading and, after the transient effects in the ropes 14 and other members have ended, the hoist brakes (not shown) may be applied and power cut off from the hoist motor 38. Thus, the cage 18 has been chaired and the tension in the ropes 14 suspending it has been predetermined by the current limit setting. The solenoid 70, as will be seen from FIG. 4, when energized, causes the valving assembly 60 to maintain the cylinders 46 retracted until the cage 18 has been removed from the chairs 27.

In order to lift the cage 18 from the chairs 27, the hoist drive is voltage suicided and the brakes released, thus allowing the counterweight 20 to descend slowly. If the weight of the cage 18 and its load 26 exceeds that of the counterweight 20, the tensions $T_1$ and $T_2$ in the ropes will equalize, and then power may be applied to lift the cage 18 off the chairs 27. On the other hand, if the cage 18 and its load 26 together weigh less than the counterweight 20, the cage will be lifted off the chairs without power application. When the cage is a few inches above the chairs 27, solenoid 72 may be energized, to operate the valve 54 to drain the positioning cylinders 48 to the drain 48a. As the positioning cylinders 48, thus, retract, they urge the chairing cylinders 46 against the cage 18. The cage 18 is then ready to proceed upon its next trip. From the foregoing, it will be seen that this preferred embodiment of the invention chairs the cage 18 with minimum effort and stress and prevents unnecessary impact between the cage 18 and the chairs 27.

Alternative embodiments

Although the present invention has been heretofore described as being constructed and arranged to lower the cage 18 to the loading level 24, it will be understood that alternatively it could be constructed and arranged to raise the cage 18 to the loading level 24. FIGS. 5 through 8 illustrate diagrammatically such an alternative embodiment of the invention. It will be understood that, although only a single cage raising means has been therein illustrated, FIGS. 5 through 8 have been simplified for the purposes of illustration and, normally, four of the illustrated cage raising means would be provided.

More specifically, as will be seen from FIGS. 5 through 8, a lever arm 74 is pivotally connected at 74a on one of the chairs 27 and is pivotable thereabout by means of a piston 75 within a hydraulic cylinder 76. The lever arm 74 carries a roller 78 adapted to engage the bottom surface 18a of the cage 18 upon pivoting of the lever arm 74 with the cage 18 slightly below the loading level 24 to urge the lowered cage 18 in an upward direction. A stop 79 is provided to limit the pivotal movement of the lever arm 74.

Figure 5:
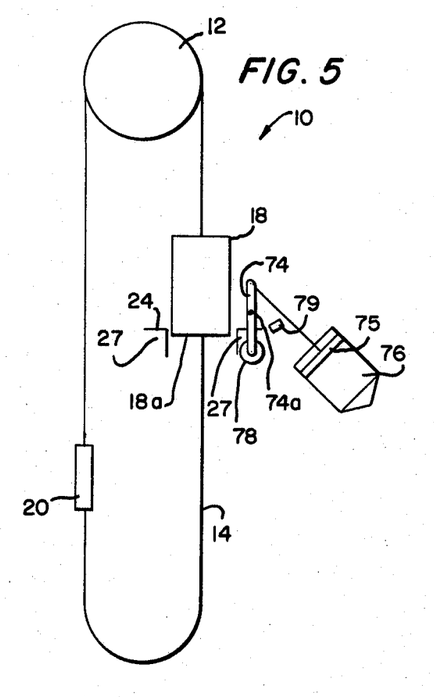
FIGS. 5 through 8 are diagrammatic views of an alternative embodiment of the present invention.
Figure 6:
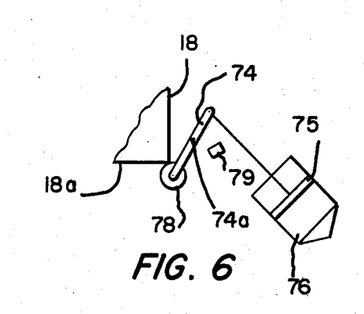
Figure 7:
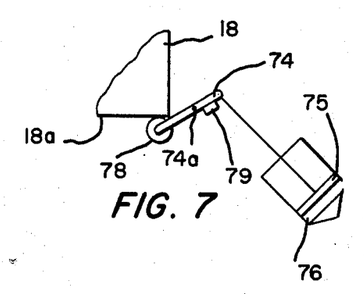

In the operation of this embodiment of the invention, the cage 18 is stopped several inches below the loading level 24 as shown in FIG. 5. Solenoid valve 86 (FIG. 8) is then actuated to supply operating fluid from a source thereof (not shown) to the cylinder 76 at a rate determined by the restriction 82. Thus, the roller 78 on the lever arm 74 is pivoted towards contact with the cage 18 at a rate determined by the restriction 82. When the lever arm 74 has been pivoted such that the roller 78 engages the cage 18 (FIG. 6), the fluid pressure in the cylinder 76 above the piston 75 operates the pressure switch 84 to energize the solenoid valve 80 to close off the supply of fluid to the cylinder 76 and, also signals the hoist control apparatus (FIG. 2) to urge the cage 18 downwardly under current limit with its brakes released. Thus, the cage 18 is current limit chaired slightly below the loading level 24 on the chairs 27. Then the solenoid valve 80 is de-energized to again supply operating fluid to the cylinder 76 above the piston 75 such that the lever arm 74 urges the cage 18 upwardly until it engages its stop 79 and the cage 18 is at the loading level 24. The hoist brakes are then applied and the hoist is voltage suicided.

Figure 8:
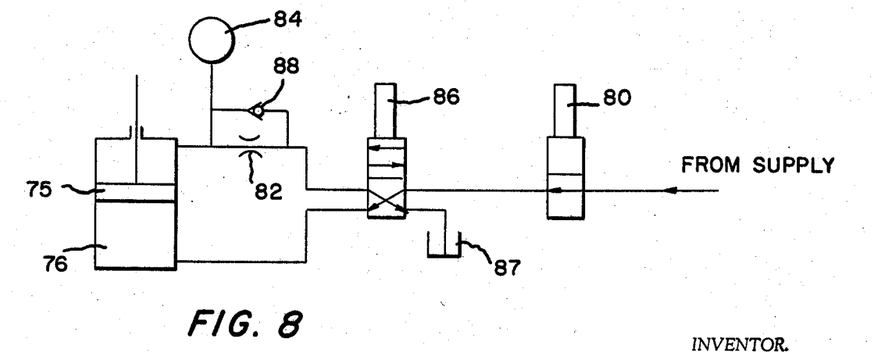

The cage 18 may be de-chaired by a method similar to that described with reference to the preferred embodiment of the invention. The lever arms 74 are swung out of the shaft by de-energizing both of the solenoid valves 80 and 86. Exhaustion of the cylinder 76 to the drain 87 is quickly and readily accomplished through the check valve 88 which is in parallel with the restriction 82.

It will be understood that this alternative embodiment of the invention requires more hydraulic power than does the preferred embodiment of the invention. It will also be understood that, although FIGS. 5 through 8 illustrate the hydraulic cylinder 76 as being carried at the loading level 24, such equipment could be mounted on the cage 18. Furthermore, although all of the hydraulic apparatus of the preferred embodiment of the invention has been shown and described as being carried by the cage 18, such could alternatively be provided at each of the loading levels 24. This arrangement, although desirable in that it reduces the deadweight on the cage 18, is preferably employed, however, only where there are only a relatively few loading levels 24 to be served due to the expense of duplicate hydraulic apparatus.

It will be seen that the beforedescribed embodiments of the invention could, if desired, be employed with multi-deck cages. However, it will also be seen that such employment would necessitate the retraction of the chairing apparatus while the cage level, being loaded or unloaded, was changed.

Figure 9:
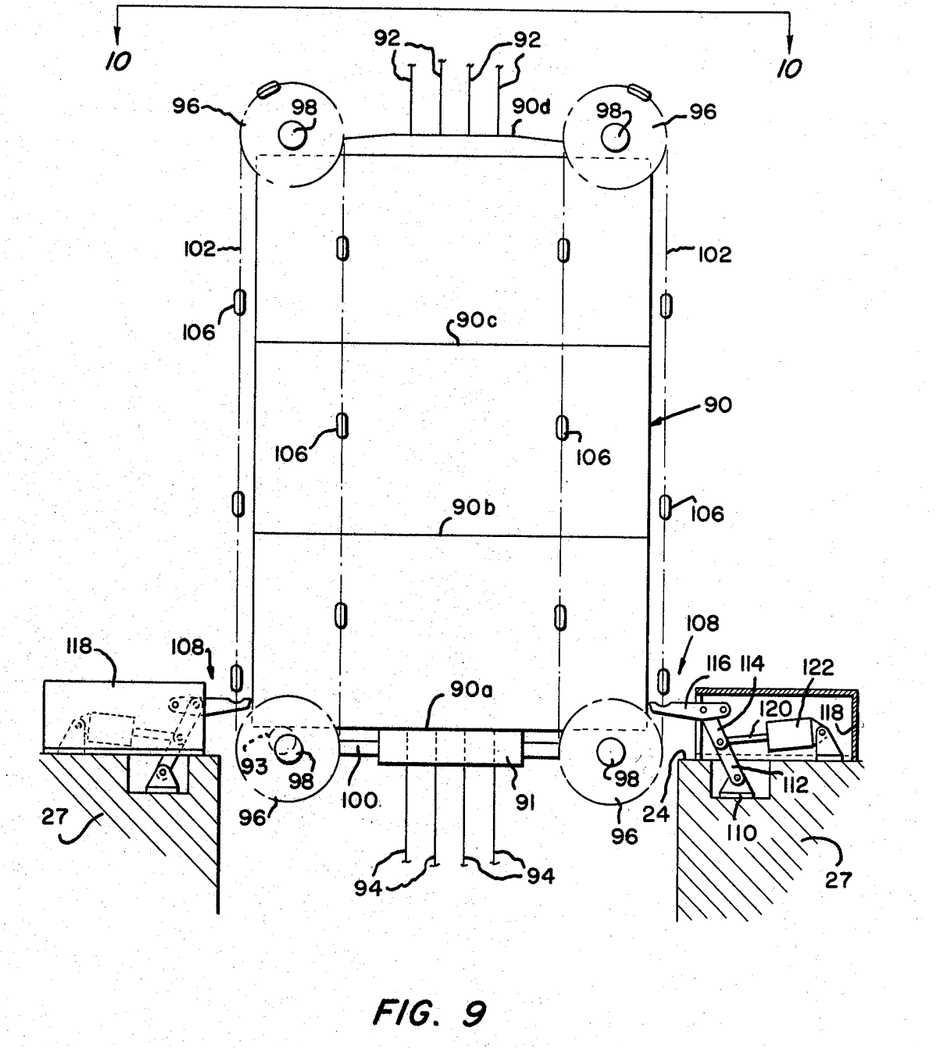
FIGS. 9 through 11 are diagrammatic views of another alternative embodiment of the present invention which is particularly adapted for employment with multideck hoist cages.
Figure 10:
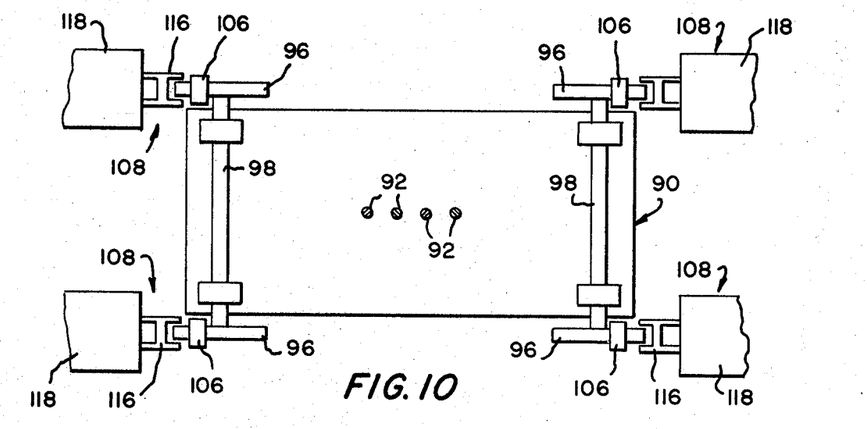
Figure 11:
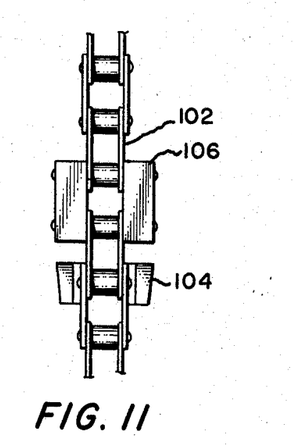

FIGS. 9 through 11 illustrate an embodiment of the present invention which is particularly adapted for multi-deck cages and where the chairing apparatus need not be retracted during the changing of the cage decks.

More specifically, FIGS. 9 and 10 illustrate a multi-deck hoist cage 90 which is suspended by the head ropes 92 and the tail ropes 94 and which includes the vertically spaced decks 90a, 90b, and 90c. The cage 90 carries a first pair of horizontally aligned shafts 98 adjacent its roof 90d and a second pair of horizontally aligned shafts 98 adjacent the deck 90a. Each of the shafts 98 is adapted for bidirectional rotation upon the cage 90; and each of the first pair of shafts 98 is in vertical alignment with one of the second pair of shafts 98.

Each of the shafts 98 fixedly carries a sheave 96 adjacent each of its opposite ends; and a single endless chain means 102 is wound around each of the pairs of vertically aligned sheaves 96 for longitudinal movement thereon upon rotation of the sheaves 96. As will be seen from FIG. 11, each of the chain means 102 is formed from a plurality of links 104 of regular width and a plurality of links 106 of extra width. As illustrated, the extra width links 106 are spaced by the regular width links 104 a distance corresponding to the distance between the adjacent decks of the cage 90; and the sheaves 96 are of such diameter that one revolution thereof moves the cage 90 down one deck spacing when the cage 90 is on the chairs 27. It will be understood that in FIG. 9, for the purposes of simplicity and clarity of description, only the extra width links 106 have been shown.

A shaft 100 is operatively connected through suitable gearing (not shown) to each of the shafts 98 which are adjacent the deck 90a and drives them in unison. The shaft 100, in turn, is driven for bidirectional rotation by a fluid pump 91, capable of operating as a fluid motor, which is carried by the cage 90. A cam 93 is mounted upon one of the shafts 98 and operates a valve means (not shown) to control the output of the fluid pump/fluid motor means 91 and, thus, is operable to control the speed of operation of the fluid pump/fluid motor means 91. It will be understood that, although the cam 93 has been illustrated and described as being carried by one of the shafts 98, it could, alternatively, be connected by suitable gearing thereto if this arrangement is necessary to obtain proper control of the fluid pump/fluid motor means 91.

A chairing apparatus 108 is provided on the chairs 27 for each of the chain means 102 and, as will be hereinafter shown, acts in cooperation therewith to chair the cage 90. Each of the chairing apparatuses 108 comprises a base 110 which is fixedly secured upon one of the chairs 27, a first link 112 which is carried by the base 110, and a second link 114 which is pivotable on the first link 112. An arm member 116 is carried by the second link 114 and is adapted to engage the chain means 102 to chair the cage 90. The arm member 116, furthermore, is pivotally connected to a frame member 118; and a piston 120 which is operatively disposed in a cylinder 122 is operatively connected to the pivotable second link 114 such that the arm member 116 may be swung out of its chairing position when the cage 90 is passing the chairs 27 at the loading level 24.

In the chairing of the deck 90a of the cage 90, the cage 90 is stopped in the position shown in FIG. 9; and the arm members 116 are swung into their illustrated position. Then the fluid pump/fluid motor means 91 is actuated to rotate the sheaves 96 until one set of the extra wide links 106 engages the arm members 116 whereupon the fluid pump/fluid motor means 91 stalls. If the hoist is automatically operated, a load sensor (not shown) may be disposed in operative relation to the chairing apparatus 108 to signal this contact between the links 106 and the arm members 116 and initiate the succeeding stage of the chairing operation.

The fluid pump/fluid motor means 91 is operated to provide resistance to the hoist drive (not shown); and the cage 90 is driven downwardly by the hoist drive against this resistance. Consequently, the speed of the cage 90 is reduced to approximately one inch per second; and the hoist drive (not shown) enters current limit in a manner believed to be apparent from the description of the preferred embodiment of the invention. When the deck 90a of the cage 90 becomes aligned with the loading level 24, the fluid pump/fluid motor means 91 is mechanically braked. Thus, when transient effects have subsided, the hoist brakes (not shown) may be applied; and the cage 90 loaded or unloaded at its deck 90a.

Subsequently, when the deck 90b is to be chaired, the cage 90 is driven downwardly and the fluid pump/fluid motor means 91 allows most of the load on the chain means 102 to be retransferred to the hoist ropes 92 and 94. Sufficient resistance is left on the chain means 102, however, to maintain the extra width links 106 in contact with the arm members 116. When the deck 90b is approximately one foot above the loading level 24, the cam 93 again operates the valve means (not shown) to increase the resistance offered by the fluid pump/fluid motor means 91 to the hoist drive (not shown). Thus, the cage speed is lowered until the hoist drive again enters current limit. When the deck 90b is at the loading level 24, the fluid pump/fluid motor means 91 is braked; and the deck 90b is ready for loading or unloading.

The deck 90c of the cage 90 is chaired in a manner believed to be apparent from the foregoing description. To dechair the cage 90, the brake on the fluid pump/fluid motor means 91 is released such that the cage 90 sinks slowly under the control of the cam 93 until all of the cage load is on the ropes 92 and 94. The arm members 116 are swung out of their operative position and the cage 90 is ready to proceed to another loading level.

From the foregoing, it will be seen that I have provided new and improved means for accomplishing all of the objects and advantages of my invention.

Having thus described my invention, I claim:

1. A hoist apparatus for moving a load into alignment with a loading level, comprising:
   a rotatable drum;
   rope means operatively associated with said drum to support said load thereon;
   means including an electrical apparatus for rotating said drum to move said load adjacent and vertically below said loading level;
   means responsive to the current drawn by said electrical apparatus of said drum rotating means to control the tension on said rope means before said load is moved into alignment with said loading level; and
   means carried by one of said load and said loading level for supporting said load relative to said loading level when such is adjacent thereto and raising said load at low speed into alignment with said loading level.

2. A hoist apparatus for moving a load into alignment with a loading level, comprising:
   a rotatable drum;
   rope means operatively associated with said drum to support said load thereon;
   means including an electrical apparatus for rotating said drum to move said load adjacent said loading level;
   means responsive to the current drawn by said electrical apparatus of said drum rotating means to control the tension on said rope means before said load is moved into alignment with said loading level;
   first fluid cylinder means carried by one of said load and said loading level for supporting said load upon said loading level when such is adjacent thereto and operable to move said load at low speed into alignment with said loading level; and
   second fluid cylinder means operatively connected to said first fluid cylinder means and operable to position such in said supporting relation.

3. A hoist apparatus for moving a load into alignment with a loading level, comprising:
   a rotatable drum;
   rope means operatively associated with said drum to support said load thereon;
   means including an electrical apparatus for rotating said drum to move said load adjacent said loading level;
   means responsive to the current drawn by said electrical apparatus of said drum rotating means to control the tension on said rope means before said load is moved into alignment with said loading level;
   first fluid cylinder means carried by said load for supporting said load upon said loading level when such is adjacent thereto and retractable to move said load at low speed into alignment with said loading level; and
   second fluid cylinder means between said load and said first cylinder means and expandable to position such in said supporting relation.

4. A hoist apparatus for moving a load into alignment with a loading level, comprising:
   a rotatable drum;
   rope means operatively associated with said drum to support said load thereon;
   means including an electrical apparatus for rotating said drum to move said load adjacent said loading level;
   means responsive to the current drawn by said electrical apparatus of said drum rotating means to control the tension on said rope means before said load is moved into alignment with said loading level;
   arm means carried by said loading level; and
   fluid cylinder means operatively connected to said arm means and operable when said load is adjacent said loading level to move said load at low speed into alignment with said loading level.

5. A hoist apparatus for moving a load having a plurality of loading decks into alignment with a loading level, comprising:
   a rotatable drum;
   rope means associated with said drum and the load for suspending the load from said drum;
   means including an electrical apparatus for rotating said drum to move the load adjacent the loading level;
   means responsive to the current drawn by said electrical apparatus of said drum rotating means to control the tension on said rope means;
   arm means mounted at the loading level; and
   chain means carried by the load and cooperating with said arm means to successively align the loading decks of the load with the loading level.

6. A hoist apparatus according to claim 5 wherein said chain means comprises a plurality of links of regular width and a plurality of links of extra width, said links of extra width cooperating with said arm means to successively align each of said loads with said loading level.

7. A hoist apparatus for moving a load into alignment with a loading level, comprising:
   a rotatable drum;
   rope means operatively associated with said drum to support said load thereon;
   means including an electrical apparatus for rotating said drum to move said load adjacent said loading level;
   means responsive to the current drawn by said electrical apparatus of said drum rotating means to control the tension on said rope means before said load is moved into alignment with said loading level;

arm means carried by said load; and fluid cylinder means operatively connected to said arm means and said load and operable when said load is adjacent said loading level to move said load at low speed into alignment with said loading level.

8. A hoist apparatus for moving a load into alignment with a loading level, comprising:

a rotatable drum;

rope means associated with said drum and the load for suspending the load from said drum;

drive means for rotating said drum to move the load to a position adjacent the loading level and for stopping the load as said position adjacent the loading level;

fluid operated motor means operable, when the load is stopped by said drive means at said position adjacent the loading level, to support the load relative to the loading level; and control means for causing said motor means to move a supported load at low speed from said position adjacent said loading level into alignment with the loading level.

9. A hoist apparatus according to claim 8, further comprising said motor means being carried by the load.

10. A hoist apparatus according to claim 8, further comprising said motor means being mounted at the loading level.

11. A hoist apparatus according to claim 8, further comprising said motor means being arranged to raise a load stopped below the loading level into alignment with the loading level.

12. A hoist apparatus according to claim 8, further comprising said motor means being arranged to lower a load stopped above the loading level into alignment with the loading level.

13. A hoist apparatus according to claim 8, further comprising said drive means including an electrical apparatus for rotating said drum, and means responsive to the current drawn by said electrical apparatus for controlling the tension in said rope means.

14. A hoist apparatus according to claim 8, further comprising second fluid operated motor means for positioning said motor means in supporting relation.

15. A hoist apparatus according to claim 8, further comprising said motor means being carried by the load, and second fluid operated motor means, connected between said motor means and the load, for positioning said motor means in supporting relation.

16. A hoist apparatus according to claim 8, further comprising arm means mounted at the loading level, said motor means being mounted at the loading level and connected to the load through said arm means.

References Cited

UNITED STATES PATENTS 3,155,891  11/1964  Rosa _____________ 318—144 X

FOREIGN PATENTS 748,707  5/1956  Great Britain.
70,107  11/1892  Germany.

ORIS L. RADER, Primary Examiner

W. E. DUNCANSON, Jr., Assistant Examiner

U.S. Cl. X.R.

187—75